United States Patent [19]

Curry et al.

[11] Patent Number: 5,311,566

[45] Date of Patent: May 10, 1994

[54] IN-SITU X-RAY TREATMENT OF ORGANICALLY CONTAMINATED MATERIAL

[75] Inventors: Randy D. Curry, Pleasanton; John R. Bayless, Malibu, both of Calif.

[73] Assignee: The Titan Corporation, San Diego, Calif.

[21] Appl. No.: 949,777

[22] Filed: Sep. 22, 1992

[51] Int. Cl.$^5$ .......................................... G21K 5/00
[52] U.S. Cl. .................................... 378/64; 378/137; 250/253
[58] Field of Search ................. 378/64, 66, 67, 68, 378/69, 121, 137, 138; 250/253, 256, 269

[56] References Cited

U.S. PATENT DOCUMENTS

| | | |
|---|---|---|
| 924,284 | 6/1909 | Smith . |
| 1,876,737 | 9/1932 | Opp . |
| 2,067,589 | 1/1937 | Antrim ........................................ 47/1 |
| 2,769,921 | 11/1956 | Nahin et al. .......................... 250/106 |
| 3,336,220 | 8/1967 | Neidl ...................................... 210/14 |
| 4,093,854 | 6/1978 | Turcotte et al. ....................... 258/269 |
| 4,503,328 | 3/1985 | Neufeld ................................. 250/269 |
| 4,713,581 | 12/1987 | Haimson ............................... 250/269 |
| 4,883,956 | 11/1989 | Melcher et al. ...................... 250/269 |
| 4,978,501 | 12/1990 | Diprose et al. ........................ 422/22 |

OTHER PUBLICATIONS

S. M. Matthews, et al., "High-Energy Irradiation of Chlorinated Hydrocarbons", American Nuclear Society International Topical Conference, Apr. 21–27, 1991, Kona, Hawaii.

Site, Technology Profiles, 4th Ed, EPA, Nov. 1991 pp. 240–241.

W. J. Cooper, et al., "High Energy Electron Irradiation: An Innovative Treatment Process for the Treatment of Aqueous Based Organic Hazardous Wastes," Proc. 5th Ann. Aerospace Hazardous Waste Minimization Conf., Costa Mesa, Calif., May 22–24, 1990.

W. J. Cooper, et al., "Removal of Halogenated Methanes, Ethanes and Ethylenes in Oxygenated Secondary Wastewater using High Energy Electrons," submitted to American Chemical Society, 1989 I&EC Div. Winter Symp. on Emerging Technologies for Hazardous Waste Treatment.

Primary Examiner—David P. Porta
Attorney, Agent, or Firm—Edward W. Callan

[57] ABSTRACT

Organically contaminated earth-bound material is treated in-situ by positioning one or more x-ray converters in chambers formed in an earth and/or water site containing such earth-bound material and irradiating the contaminated material in-situ adjacent to each chamber with x-radiation from the x-ray converter to decompose the organic compounds. A high energy electron beam from a electron beam source is directed to the x-ray converter to produce the x-radiation. The electron beam source, such as a linear induction accelerator or an RF linear accelerator may be positioned either within the chamber near the x-ray converter or above ground.

6 Claims, 1 Drawing Sheet

IN-SITU X-RAY TREATMENT OF ORGANICALLY CONTAMINATED MATERIAL

BACKGROUND OF THE INVENTION

The present invention generally pertains to treatment of organically contaminated material and is particularly directed to decomposing organic compounds in the contaminated material by irradiating the material with a beam of high energy radiation.

It is known to decompose organic compounds in contaminated material by irradiating the material with a beam of high energy radiation, such as an electron beam, x-rays or gamma-rays, as the contaminated material is transported past the beam source. The radiated high energy beam breaks up complex molecules and water molecules to form radicals that react with the contaminant organic compounds to form compounds such as water, carbon dioxide and oxygen and thereby decompose the contaminant organic compounds.

SUMMARY OF THE INVENTION

The present invention provides a method of treating organically contaminated earth-bound material, comprising the steps of: a) forming a chamber in the organically contaminated material; b) positioning an x-ray converter in the chamber; and c) irradiating the contaminated material in-situ adjacent to the chamber with x-radiation from the x-ray converter to decompose the organic compounds.

The present invention thereby also provides a method of treating an earth and/or water site containing organically contaminated material, comprising the steps of: a) forming a plurality of chambers throughout the site for receiving one or more x-ray converters; b) positioning an x-ray converter in each chamber; and c) irradiating the contaminated material in-situ adjacent to each chamber with x-radiation from the x-ray converter to decompose said organic compounds.

The present invention further provides a system for treating organically contaminated material, comprising an x-ray converter positioned in a chamber formed in earth-bound material contaminated by organic compounds; a high energy electron beam source; and means for directing a high energy electron beam from the electron beam source to the x-ray converter to produce x-radiation for irradiating the contaminated material in-situ adjacent to the chamber with the x-radiation to decompose the organic compounds, wherein the high energy electron beam source is positioned above ground and the system further comprises means for guiding the electron beam from the electron beam source to the x-ray converter.

X-radiation has a penetration depth on the order of three-to-ten times that of an electron beam, whereby it is practical to treat contaminated earth-bound organically contaminated materials in-situ and thus avoid the expense of extracting the contaminated materials from the earth, packaging the extracted materials and transporting such materials past a radiation source.

Additional features of the present invention are described in relation to the detailed description of the preferred embodiments of the invention.

DETAILED DESCRIPTION

Figure 1:
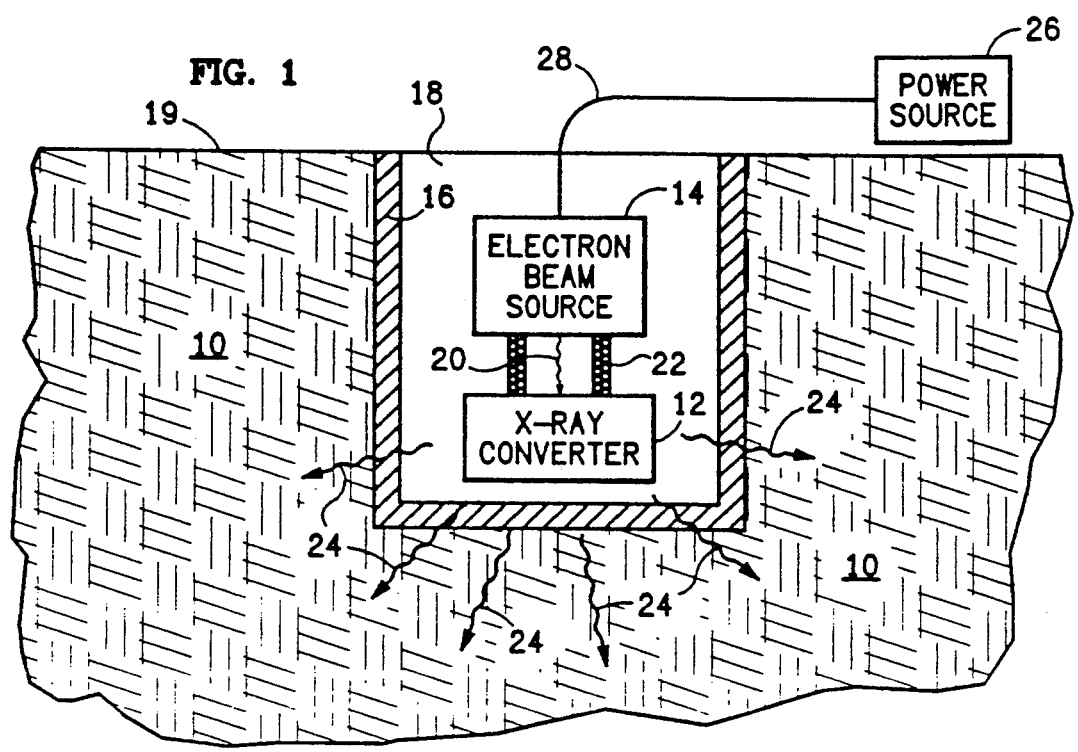
FIG. 1 is a partial block diagram of one preferred embodiment of the system of the present invention.

Referring to FIG. 1, one preferred embodiment of a system for treating earth-bound organically contaminated material 10 includes an x-ray converter 12 and a high energy electron beam source 14 positioned within a casing 16 in a chamber 18 formed below ground level 19 in the contaminated earth-bound material 10, which may be contaminated soil, a contaminated aqueous solution or a combination thereof. The high energy electron beam source 14 is positioned in the chamber 18 near the x-ray converter 12. Positioning the electron beam source 14 within the chamber 18 eliminates many of the hazards associated with persons being exposed to x-rays.

An electron beam 20 from the source 14 is guided by a magnetic field provided by a focusing coil 22 so that the beam 20 is directed to the x-ray converter 12 to thereby cause the x-ray converter 12 to produce x-radiation 24 which irradiates the contaminated material 10 in-situ adjacent to the chamber 18. Energetic photons in the x-radiation 24 collide with the irradiated material 10 to produce secondary electrons within the material 10. The secondary electrons break up complex molecules and water molecules in the irradiated material 10 and form radicals which react with the contaminant organic compounds to form compounds such as water, carbon dioxide and oxygen and thereby decompose the contaminant organic compounds.

A power source 26 for the electron beam source 14 is positioned above ground and is connected to the electron beam source 14 by conductive wire 28 or a microwave waveguide (not shown).

The x-ray converter 12 is a high-Z material, such as tantalum. The conversion efficiency is in a range of one to twelve percent for an electron beam having an energy in a range of from 1 to 10 MeV. In alternative embodiments, the x-ray converter may be steel pipe used for the casing 16, which is a moderate-Z material. Although the conversion efficiency of the steel pipe is quite a bit less, the steel pipe provides better thermal transfer, which allows the converter to be naturally cooled. When a high-Z material is used for the x-ray converter 12, forced water or air cooling (not shown) may be used.

In an alternative embodiment (not shown), the contaminated material being treated also functions as an x-ray converter, whereby the electron beam is directed to the walls of the chamber in the site of the contaminated material.

The electron beam source 14 is a linear induction accelerator. Alternatively, the electron beam source 14 may be an RF linac, a dynamatron, an insulated core transformer-type accelerator or a rep-rated pulse forming line accelerator. The linear induction accelerator and the RF linear accelerator are the most versatile and can be scaled to the kilowatt or megawatt level required for a particular treatment application.

Figure 2:
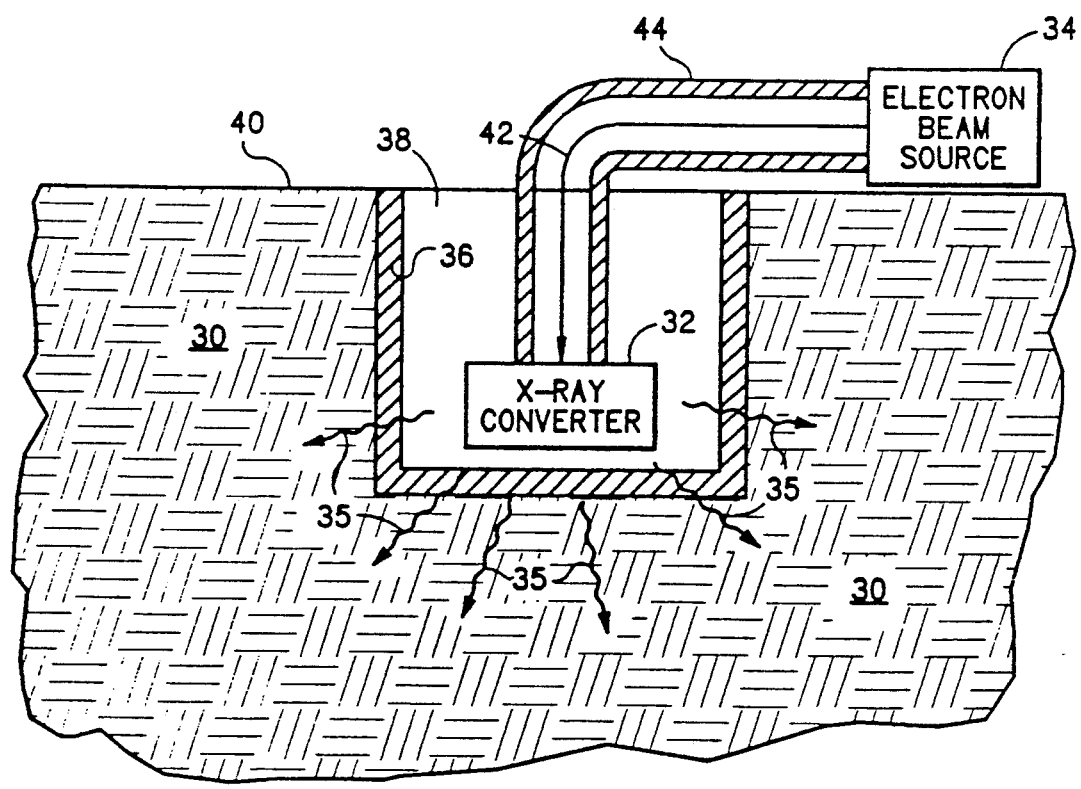
FIG. 2 is a partial block diagram of another preferred embodiment of the system of the present invention.

Referring to FIG. 2, another preferred embodiment of a system for treating earth-bound organically contaminated material 30 includes an x-ray converter 32 and a high energy electron beam source 34. The x-ray converter 32 is positioned within a casing 36 in a chamber 38 formed below ground level 40 in the contaminated earth-bound material 30, and the high energy electron beam source 34 is positioned above ground. An electron beam from the source 34 is guided by a conductive wire 42 inside an evacuated duct 44 so that the beam is directed to the x-ray converter 32 to thereby cause the x-ray converter 32 to produce x-radiation 35 which irradiates the contaminated material 30 in-situ adjacent to the chamber 38.

Alternatively, the electron beam may be guided to the x-ray converter 32 by using such techniques as laser focusing in a low pressure gas, magnetic field transport (solenoid or quadrupole) or ionized gas channel transport by which the electron beam propagates through a channel created in a gas with an external electron beam or by self-current neutralization.

Except for the differences incident to the electron beam source 34 being positioned above ground, the embodiment of FIG. 2 is constructed and functions in the same manner as the embodiment of FIG. 1.

The present invention is particularly effective in decomposing volatile and semivolatile organic compounds that contaminate soil and aqueous sites, such as benzene, trichloroethane, trichloroethylene and polychlorinated biphenyls (PCB).

We claim:

1. A method of treating organically contaminated material, comprising the steps of:
    a) positioning an x-ray converter in a chamber formed in earth-bound material contaminated by organic compounds; and
    b) irradiating the contaminated material in-situ adjacent to the chamber with x-radiation from the x-ray converter to decompose said organic compounds; wherein step b) comprises the step of:
    c) directing a high energy electron beam to the x-ray converter to produce said x-radiation by guiding said high energy electron beam to the x-ray converter from an above-ground electron beam source.

2. A method according to claim 1, wherein step c) comprises the step of:
    d) guiding said high energy electron beam to the x-ray converter from an above-ground electron beam source by guiding the beam with a wire.

3. A method of treating an earth and/or water site containing organically contaminated material, comprising the steps of:
    a) forming a plurality of chambers throughout the site for receiving one or more x-ray converters;
    b) positioning an x-ray converter in each chamber;
    c) irradiating the contaminated material in-situ adjacent to each chamber with x-radiation from the x-ray converter to decompose said organic compounds; and
    d) directing directing a high energy electron beam to the x-ray converter to produce said x-radiation by guiding said high energy electron beam to the x-ray converter from an above-ground electron beam source.

4. A method according to claim 3, wherein step d) comprises the step of:
    e) guiding said high energy electron beam to the x-ray converter from an above-ground electron beam source by guiding the beam with a wire.

5. A system for treating organically contaminated material, comprising
    an x-ray converter positioned in a chamber formed in earth-bound material contaminated by organic compounds;
    a high energy electron beam source; and
    means for directing a high energy electron beam from the electron beam source to the x-ray converter to produce x-radiation for irradiating the contaminated material in-situ adjacent to the chamber with said x-radiation to decompose said organic compounds;
    wherein the high energy electron beam source is positioned above ground and the system further comprises
    means for guiding the electron beam from the electron beam source to the x-ray converter.

6. A system according to claim 5, wherein the guiding means comprises a wire for guiding the beam.

* * * * *